United States Patent [19]
Der Beek

[11] Patent Number: 5,336,511
[45] Date of Patent: Aug. 9, 1994

[54] EDIBLE CONE AND APPARATUS AND METHOD FOR MAKING SAME

[76] Inventor: Daniel V. Der Beek, 253A Glascow Turnpike, Woodstock, N.Y. 12498

[21] Appl. No.: 894,992

[22] Filed: Jun. 8, 1992

[51] Int. Cl.$^5$ .............. A21B 5/02; A21C 15/02; A21D 13/00
[52] U.S. Cl. .................. 426/138; 99/383; 99/439; 425/414; 426/139
[58] Field of Search .............. 426/138, 139, 94; 99/383, 439; 425/414

[56]  References Cited
U.S. PATENT DOCUMENTS

| | | | |
|---|---|---|---|
| 1,850,356 | 3/1932 | Parr | 426/139 |
| 1,936,835 | 11/1933 | Fairchild | 426/138 |
| 4,624,855 | 11/1986 | Haas, Sr. et al. | 426/138 |
| 4,775,543 | 10/1988 | Mani | 426/138 |
| 5,045,329 | 9/1991 | Goglanian | 426/138 |

Primary Examiner—Donald E. Czaja
Assistant Examiner—Mary S. Mims
Attorney, Agent, or Firm—Charles J. Brown

[57]  ABSTRACT

An edible cone having a flexible body of substantially right elliptical cone shape with opposed rounded proximate and remote sides flairing from a vertex portion to and including a mouth portion, with opposed lip segments defining the mouth portion and having arcuate edges joined end-to-end at the remote sides of the body and curving away from one another and from the vertex portion, so that the lip segment edges are farthest from one another and from the vertex portion at the proximate sides of the body portion, and an apparatus and method for making such a cone.

36 Claims, 6 Drawing Sheets

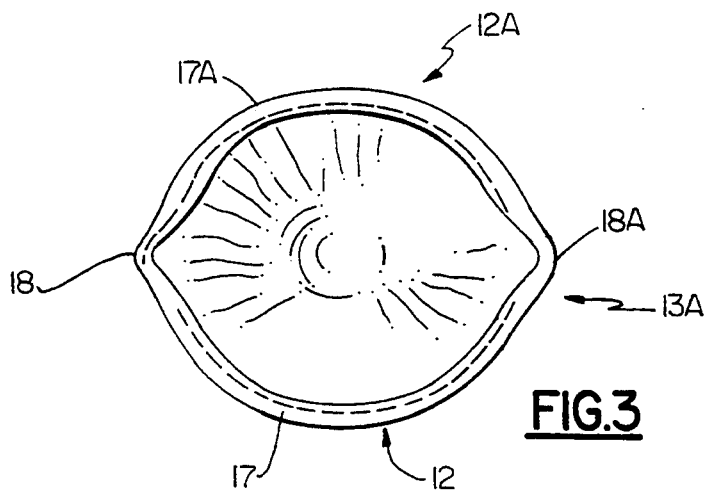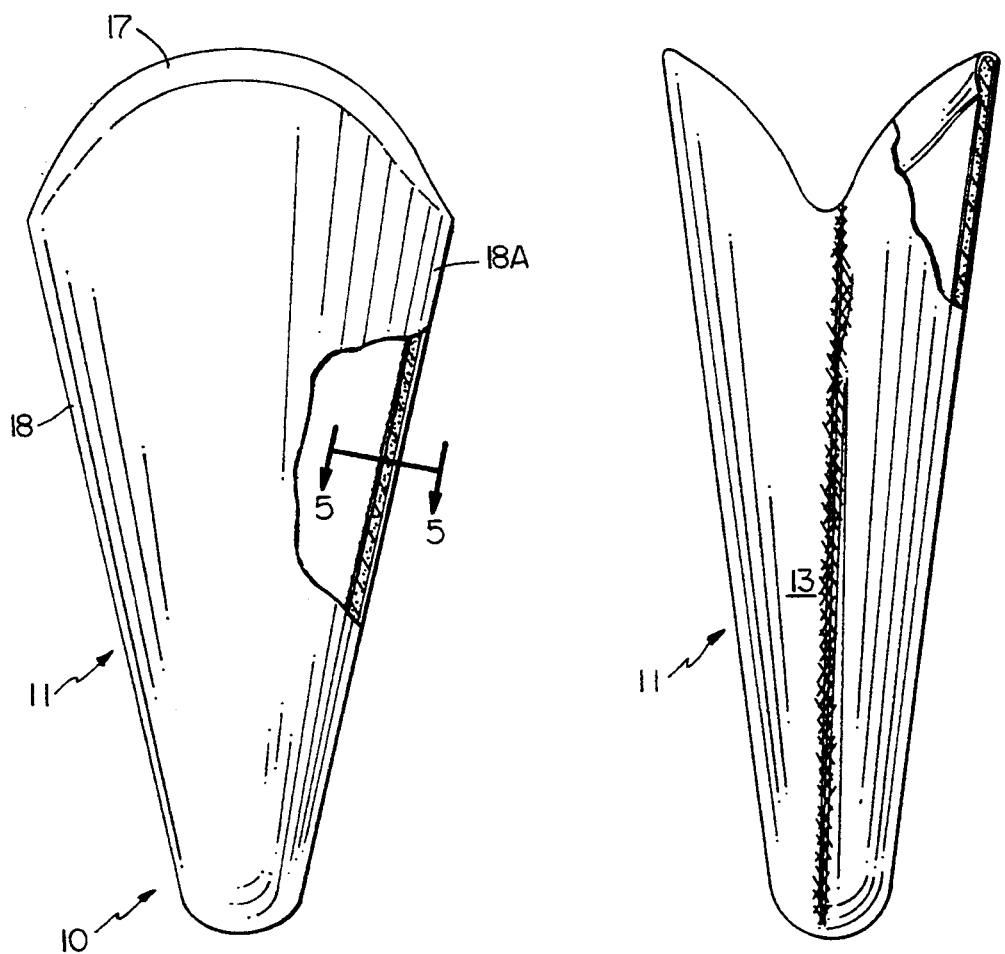

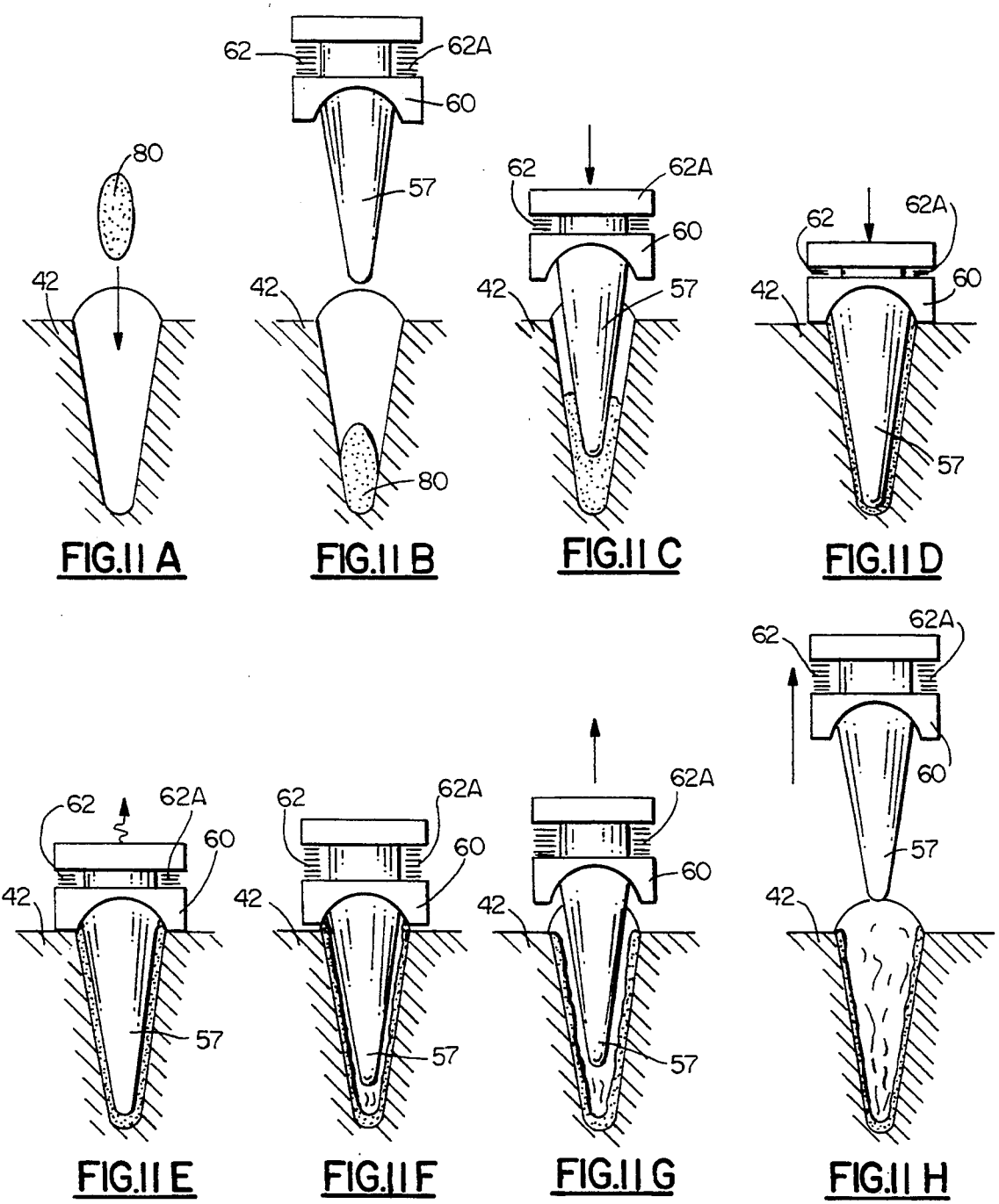

EDIBLE CONE AND APPARATUS AND METHOD FOR MAKING SAME

BACKGROUND OF THE INVENTION

Edible cones and apparatus and methods for making them have long been known in the prior art, some of the earlier patents being U.S. Pat. Nos. 1,274,506 and 1,417,757. Such cones usually have a closed pointed or somewhat rounded vertex portion and a body of right cylindrical cone shape, which is to say a shape described by a moving straight line passing through a fixed vertex point and tracing a circle. Most conventional cones are of pastry, brittle and wafer-like, and often are intended to hold cold edible contents such as ice cream. Some, such as that taught in U.S. Pat. No. 1,417,057, have a mouth rim which is thicker than the remainder of the cone wall.

Cones or other edible containers specially adapted to hold hot edible contents are also known, as taught for example in U.S. Pat. Nos. 4,313,964 and 3,290,154. The latter is also of interest because it calls for a container wall which is crusted on its inside and outside surfaces with a soft large-cell non-crusted interior between.

No known edible cones of the prior art are formed in other than right cylindrical conical shapes or cup shapes. Conventional cones and other edible containers also are believed not to include any form of double-thickness wall similar to that of pita-bread. Neither do known designs of cones include a mouth rim which is other than planar, which is to say a rim which is equidistant at all points from the vertex or base of the cone.

Conventional right circular or cup shaped cones with circular planar rims have certain disadvantages. At least at the beginning of consumption they cannot readily be bitten in a single moderate mouthful across their full width to include portions of opposite cone walls and edible contents, which is one of the satisfying characteristics of a sandwich. Also such cones must be held upright and should not be laid on their sides, which is a marked shortcoming if reheating in a microwave or conventional oven is necessary. Neither do prior art cones include any integral wall means for covering the contents within, which would allow the contents to be held in place if the cone were disposed other than upright and also would achieve sealing, permitting storage of prefilled cones prior to consumption.

Apparatus and methods for making prior art cones include the use of matching female and male molds of a shape conforming to that of the finished product. It is common to heat such molds to cook the material of which the cones are made and also to provide a plurality of cojoined molds operating together, all of which is taught in U.S. Pat. No. 1,274,506. However, prior art cone-making apparatus and methods are not known to include two-stage processes where the cone is first preformed by a male forming mold and then finished with a second male cooking mold. As a consequence the wall construction of a cone made by conventional single-step apparatus and methods is typically of uniform and monolithic cross-section from its inside to outside surfaces or perhaps somewhat more crusted on the inside and outside surfaces with a softer cell wall between. It has been beyond the capability of prior art cone-making apparatus and methods to achieve a double-thickness wall defining air spaces therebetween with the characteristics of pita-bread.

SUMMARY OF THE INVENTION

The invention provides an edible cone adapted to contain edible contents. The cone comprises a closed vertex portion and a flexible body of substantially right elliptical, in contrast to right conical, cone shape with opposed rounded proximate and remote sides flaring from the vertex portion to and including a mouth portion. Opposed lip segments define the mouth portion and have arcuate edges joined end-to-end at the opposed remote sides of the body which curve away from one another and from the vertex portion so that the lip segment edges are farthest from one another and from the vertex portion at the proximate sides of the body.

In a preferred form a substantial portion of the body of the cone comprises a double thickness pita-like wall. The lip segment arcuate edges may define a less than fully cooked mouth rim which is thicker than the remainder of the cone. The arcuate edges of the mouth portion may be joined end-to-end substantially at the center of the opposed remote sides of the body, and the lip segment edges may be farthest from one another and from the vertex portion substantially at the center of the opposed proximate sides of the body. In the cone of the invention a pair of opposed crease lines of relatively thin wall thickness may be formed from the vertex portion to the respective end-to-end joinder points of the opposed lip segments. The difference between the distance from the vertex portion to the arcuate edges of the lip segments at the opposed proximate sides of the body portion and the distance from the vertex portion to the end-to-end joinder points of the opposed lip segments is sufficient to permit the lip segments to be capable of being gathered together over edible contents within the cone.

Edible particulate material may be embedded in the exterior surface of the body. The cone may be cooked from unleavened dough formed from a protein-rich paté of at least one of lean meat, chicken, seafood, cheese and soy curd mixed with a lesser amount by volume of a binding agent. The dough may comprise approximately two parts by volume of the paté and one part by volume of the binding agent, and the binding agent may be flour. The flour may comprise approximately equal parts by volume of a protein-rich high-gluten elastic flour and a firm-setting fine-grain stable corn-and-rice flour blend.

The invention also includes the aforementioned cone in combination with the edible contents. In that form the lip segment edges may be sized to be capable of being gathered together over the edible contents within the cone. In one preferred form the lip segment edges may be gathered together along a serpentine line throughout their length.

The invention also provides apparatus for making the above-described edible cones. The apparatus includes a female mold defining a mold cavity having a lower closed vertex portion, a body of substantially right elliptical cone shape with opposed proximate and remote sides flaring upwardly from the vertex portion to and including an upper mouth portion, and opposed lip-forming portions defining the mouth portion and having arcuate edges joined end-to-end at the opposed remote sides of the body and curving upwardly away from one another and from the vertex portion so that the edges are farthest from one another and from the vertex portion at the proximate sides of the body. A male forming mold is provided which has an exterior configuration substantially matching that of the female mold cavity and insertable within the female mold cavity in closely spaced relation thereto. A male cooking mold is provided also having an exterior configuration substantially matching that of the male forming mold and insertable within the mold cavity in closely spaced relation thereto, and also formed with an encircling cutaway groove along a curved path disposed generally opposite the arcuate edges of the lip-forming portions of the female mold when the male cooking mold is in its inserted position in the male cavity. Means are included for heating each of the female mold and the male mold. A shank is provided from which each male mold depends. Displacement means are included associated with each shank for moving its associated male mold axially into and out of the mold cavity of the associated female mold. A sleeve closely surrounds each shank and has a lower curved annular surface conforming to and engaging the arcuate edges of the lip-forming portions of the female mold to cover the mold cavity mouth when the associated male mold is in its inserted position. Each sleeve is axially displaceable on its shank against a compression spring bias to allow limited axial withdrawal of the associated male mold while the associated sleeve lower annular surface remains urged against the arcuate edges of the lip-forming portion of the female mold.

A pair of crease-forming linear ridges may be formed on at least one of the female molds and the male forming and cooking molds from the associated vertex portion to the end-to-end joinder points of the opposed lip-forming portions. The spring bias on the sleeve associated with the male forming molds may be less than that on the sleeve associated with the male cooking molds. Each of the female and male molds may be formed of polytetraflourethylene-coated aluminum. The arcuate edges of the opposed lip-forming portions may be joined end-to-end substantially at the center of the opposed remote sides of the body portion and the lip segments edges may be farthest from one another and from the vertex portion substantially at the center of the proximate sides of the body.

In a preferred form of the apparatus the difference between the distance from the vertex portion to the arcuate edges of the lip segments at the opposed proximate sides of the body and the distance from the vertex portion to the arcuate edges at the opposed remote sides of the body is sufficient to permit the lip segments on the cone to be gathered together over edible contents within the cone.

Indexing means may be provided for first locating the female mold at a dough-loading and cone-removing station, then locating the female mold at a forming station for insertion of the male forming mold, then locating the female mold at a cooking station for insertion of the male cooking mold and then returning the female mold to the first cone-removing and dough loading station. The female mold may be mounted on a carousel which is rotated to advance the female mold from one of the stations to the next. The compression spring bias on each sleeve also causes the cone to be pushed off the associated male mold upon withdrawal of the male mold. A plurality of the female molds may be cojoined and operated with respective pluralities of corresponding cojoined male forming molds and cooking molds.

The invention also provides a method for making the edible cone described herein. The method of the invention comprises first placing a pre-determined amount of selected dough in a mold cavity in a heated female mold having a lower closed vertex portion, a body of substantially right elliptical cone shape with opposed proximate and remote sides flaring upwardly from the vertex portion to and including an upper mouth portion, and opposed lip-forming portions defining the mouth portion and having arcuate edges joined end-to-end at the opposed remote sides of the body and curving upwardly away from one another and from the vertex portion so that the edges are farthest from one another and from the vertex portion at the proximate sides of the body. Inserted into the mold cavity is a heated male forming mold having an exterior configuration substantially matching that of the mold cavity, until the male forming mold is in closely spaced relation to the cavity and the dough is forced throughout the entire cavity around the entire male forming mold. An otherwise open annulus between the male forming mold and the arcuate edges of the female mold mouth lip portion is covered to prevent escape of dough therethrough. The male forming mold is allowed to back off in relation to the cavity while continuing to cover the aforementioned annulus to cook the dough to firm but not fully cooked consistency making it self-supporting in the cavity upon withdrawal of the male forming mold. The male forming mold is then withdrawn from contact with the not fully cooked dough. Inserted into the mold cavity is a heated male cooking mold having an exterior configuration substantially matching that of the male forming mold and also formed with an encircling cutaway groove along a curved path disposed generally opposite the arcuate edges of the lip-forming portions of the female mold when the male cooking mold is in its inserted position in the die cavity. An otherwise open annulus between the male cooking mold and the arcuate edges of the female mold mouth lip portions is covered to control steam release. The male cooking mold is then advanced to its fully inserted position in the cavity to contact the inner surface of the dough. The male cooking mold is then withdrawn and reinserted in a selected time cycle in relation to the cavity, while the last-mentioned annulus continues to be covered, to cook the dough fully while leaving a not fully cooked thicker rim about the arcuate edges of the mouth lip portions not contacted by the cutaway groove. The male cooking mold is then fully withdrawn from the cavity and the cooked cone is removed from the cavity.

In this preferred form of the method the withdrawing and reinserting of the male cooking mold results in a double thickness pita-like cone wall. A pair of crease-line-forming linear ridges may be formed on at least one of the female mold and male forming and cooking molds from the associated vertex portion to the end-to-end joinder points of the opposed lip-forming portions. The temperature of the heated female molds may be greater than that of the male forming molds and the temperature of the heating male cooking molds may be greater than that of the female molds. The temperature of the female molds may be approximately 350° F., that of the male forming molds may be approximately 195° F. and that of the male cooking molds may be approximately 360° F.

The pre-determined amount of dough in the method of the invention may have edible particulate material embedded in its exterior surface, the majority of which may be disposed on the exterior surface of the cooked cone. The pre-determined amount of dough may be formed of a protein-rich paté of at least one of lean meat, chicken, seafood, cheese and soy curd mixed with a lesser amount by volume of a binding agent. The dough may comprise approximately two parts by volume of the paté and one part by volume of the binding agent and the binding agent, may be flour. The flour may comprise approximately equal parts by volume of protein-rich high-gluten elastic flour and a firm-setting fine-grain stable corn-and-rice flour blend.

The method of the invention may also include the additional step of placing edible contents within the cooked cone so that the contents are crowned between lip segments of the cone formed by the opposed lip-forming portions defining the mouth portion of the female mold. The lip segments may be folded together over the crown of the edible contents and the edges of the lip segments may be crimp-sealed together to enclose the edible contents within the cone. The lip segment edges may be gathered together along a serpentine line throughout their length.

BRIEF DESCRIPTION OF THE DRAWINGS

FIG. 1 is a side elevation partly broken away of one proximate side of the cone of the invention;

FIG. 2 is a side elevation partly broken away of one remote side of the cone of the invention;

FIG. 3 is a top plan view of the cone of FIGS. 1 and 2;

DESCRIPTION OF PREFERRED EMBODIMENT

Figure 4:
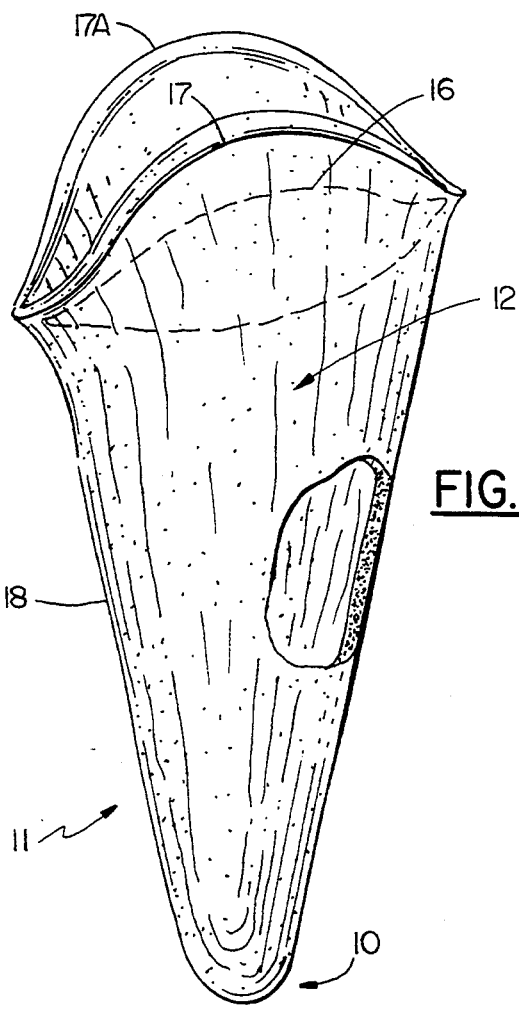
FIG. 4 is a perspective view partly broken away of the cone of the invention with its mouth portion open.

Referring first to FIGS. 1 to 5 the edible cone of the invention includes a closed rounded vertex portion 10. A flexible body 11 is of substantially right elliptical cone shape, which is to say a shape described by a moving substantially straight line passing through a fixed vertex point and tracing substantially an ellipse. The tracing line may be other than precisely straight, as for example somewhat curved to impart a slight bulged shape to the cone. Also, the figure it traces may be other than precisely elliptical, as for example an oval or even an assymetrical egg shape. Also, it is within the meaning of these terms that flats or ridges or other surface configurations in various patterns, including printing, be formed on the cone surface. The body 11 thus defines opposed rounded proximate sides 12 and 12A and opposed rounded remote sides 13 and 13A all flairing from the vertex portion 10. The included angle of the vertex portion formed by the proximate sides 12 and 12A as seen in FIG. 1 is greater than that formed by the remote sides 13 and 13A as seen in FIG. 2. The former may be approximately 24° whereas the latter may be approximately 16°.

The body 11 includes a mouth portion 15 defined by opposed lip segments 16 and 16A which have arcuate edges 17 and 17A joined end-to-end substantially at the center of the opposed remote sides 13 and 13A of the body 11. These arcuate edges 17 and 17A of the lip segments 16 and 16A curve away from one another and from the vertex portion 10 so that they are farthest from one another and from the vertex portion substantially at the center of the proximate sides 12 and 12A of the body 11.

A pair of opposed crease lines 18 and 18A of relatively thin wall thickness are formed from the vertex portion 10 to the respective end-to-end joinder points of the opposed lip segments 16 and 16A along the remote sides 13 and 13A of the body 11. The purpose of the crease lines is to provide hinges along which the proximate sides 12 and 12A of the body 11 bend together during consumption.

The distance from the vertex portion 10 to the end-to-end joinder points of the opposed lip segments 16 and 16A may typically be about six inches. The distance from the vertex portion 10 to the arcuate edges 17 and 17A of the lip segments 16 and 16A at the center of the opposed proximate sides 12 and 12A of the body portion 11 may typically be about seven inches. The difference between those distances is sufficient to permit the lip segments 16 and 16A to be gathered together over edible contents within the cone. The maximum dimension between the proximate sides 12 and 12A of the cone may be one and one-half inches and between the remote sides 13 and 13A three inches.

The arcuate edges 17 and 17A of the lip segments 16 and 16A define a less than fully cooked mouth rim which is thicker than the remainder of the cone by viture of not being fully cooked and is capable of being crimp-sealed over the contents of the cone.

The cone is preferably cooked from a moisture-rich unleavened paté dough high in protein, which imparts strength and flexibility. In one preferred form a paté is a mix of liquid and approximately 65% by volume of at least one of lean meat, chicken, seafood, cheese and soy curd together with approximately 35% of flour. An example of one suitable paté is a puree of soybean curd blended with approximately 20% by volume of cold liquid such as soy milk or concentrated stock. Chicken or shrimp patés require the addition of a small amount of oil. An appropriate flour consists of two parts by volume of protein-rich and very elastic high-gluten flour combined with one part each of very stable and firm setting fine-grain corn and rice flours.

Figure 5:
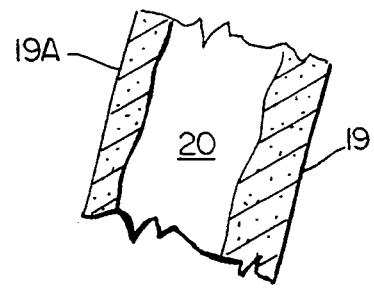
FIG. 5 is an enlarged fragmentary section of the cone wall taken along the line 5—5 of FIG. 1.

As a consequence of the method described hereinafter a substantial portion of the body portion 11 of the cone wall is of double thickness similar to that of pita bread, as shown by the enlarged fragmentary section of FIG. 5. The wall comprises an outer shell 19 and a somewhat thinner inner shell 19A defining between them an air-space 20 of irregular dimensions. It is contemplated that at limited places the outer and inner shells 19 and 19A may come together to interrupt the air-space 20. The pita effect, which is achieved in the method of the invention described below, creates two thin entirely separate inner and outer walls separated by a region of air and a certain amount of lesser cooked dough. This double wall pita-like effect is palatable and avoids the use of nutritionally compromising leavening agents. In addition it creates a self-insulating effect which permits the consumer to hold the cone without discomfort even though it contains edible contents of too high a temperature to be eaten. In addition the double-wall effect adds to the strength of the cone much like safety glass to prevent the wall from cracking.

In a preferred form of the cone an edible particulate material is embedded in the exterior of the cone wall. It may be ground nuts or a dry blend of herbs and spices and may include seasonings such as salt, pepper or relatively neutral herbs such as granulated onion and/or garlic and a small amount of sweetener such as sugar. The outer particulate material permits easy handling of the dough at the commencement of the cone-making method described below and serves as a release agent when the finished cone is separated from the molds. In the finished cone itself, the outer particulate material increases the wall strength and provides a somewhat roughened outer surface which is easy to grip and which provides attractive visual and tactile properties. Since the outer particulate material is toasted it also enhances the flavor and aroma of the finished cone.

Figure 6:
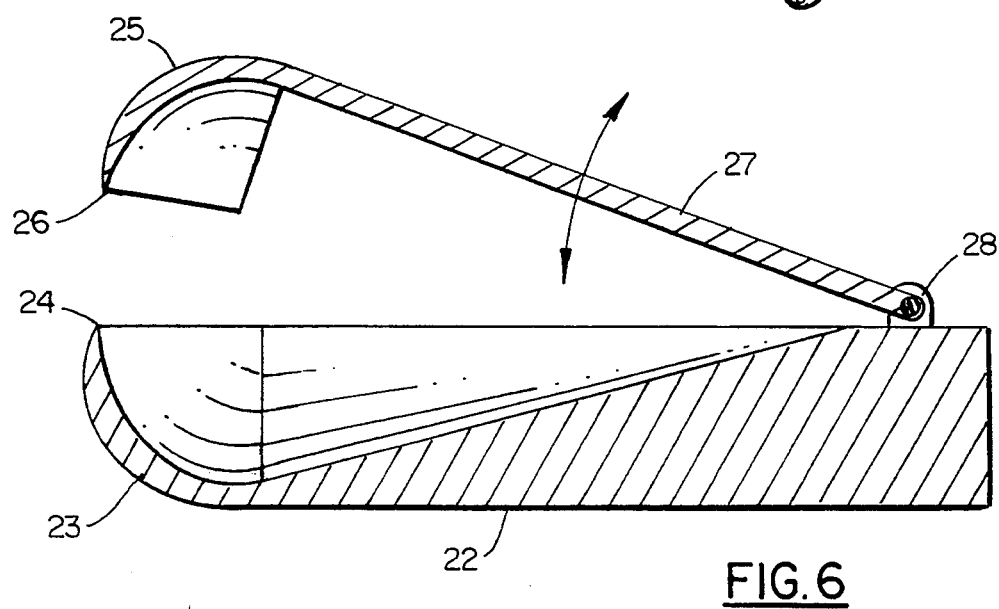
FIG. 6 is an elevation in section of apparatus somewhat schematically illustrated for crimping the lip segments of the cone into closed position.

FIG. 6 somewhat schematically illustrates preferred apparatus for crimping together the edges 17 and 17A of the lip segments 16 and 16A of a typical cone of the invention after the cone has been filled with contents which bulge in a crown between the lip segments. The crimping apparatus includes a hollow cradle 22 conforming to the shape of that half of the body 11 which includes one of the proximate sides 12 or 12A. At one end of the cradle 22 is affixed a lower half crimping die 23 shaped very much in the form of a half clam shell to fit the contour and bulge of one of the lip segments and the crowned filling. The half crimping die 23 may have a serpentine cutting edge 24 and is correspondingly fluted on its curved surface. The filled cone is laid in the half support 23 with one of its proximate sides downwardly and with one of its lip segments resting in the lower crimping die 23.

Figure 7:
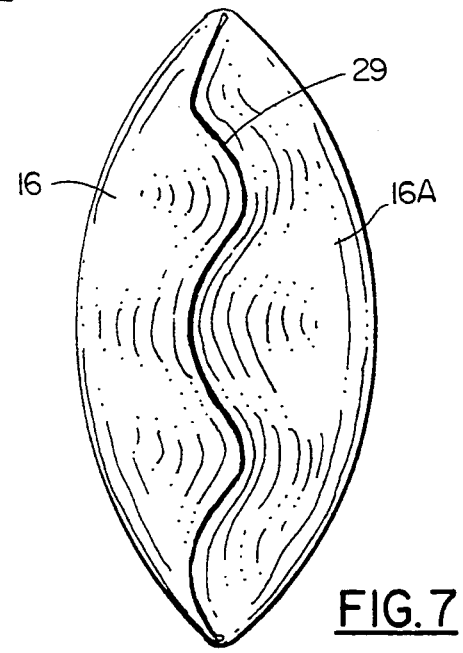
FIG. 7 is an end view of the filled cone after crimp sealing.

An upper half crimping die 25 is provided which has a shape similar to that of the lower half crimping die 23. A serpentine cutting edge 26 is formed on the upper half crimping die 25 to register with the serpentine cutting edge 24 on the lower half crimping die 23. The upper half crimping die 25 is mounted on an arm 27 pivoted at 28 so as to be turned away clockwise and to the right as shown in FIG. 6 to permit insertion of the cone in the cradle 22. The arm 27 and the upper half crimping die 25 are then turned downwardly counterclockwise to bring the cutting edge 26 around and down into cutting registry with the cutting edge 24. Both the lower and upper half crimping dies 23 and 25 are heated by any suitable means so as to crimp seal the partially cooked edges 17 and 17A of the lip segments 16 and 16A. They also trim away excess dough. An end view of the cone after crimp sealing is shown in FIG. 7 with the lip segments thereof gathered together in serpentine configuration and somewhat fluted. A serpentine rather than straight crimp line 29 increases the surface area along the crimp line thereby offsetting the tendency of the ellipse to flatten.

It may be desirable to prick the lip segments 16 and/or 16A of the cone just below the crimp-sealed edges 17 and 17A to form small vent holes which allow release of steam during reheating prior to consumption. Such holes may be formed by pricking means, not shown, on one or both of the dies 23 and 25.

Figure 9:
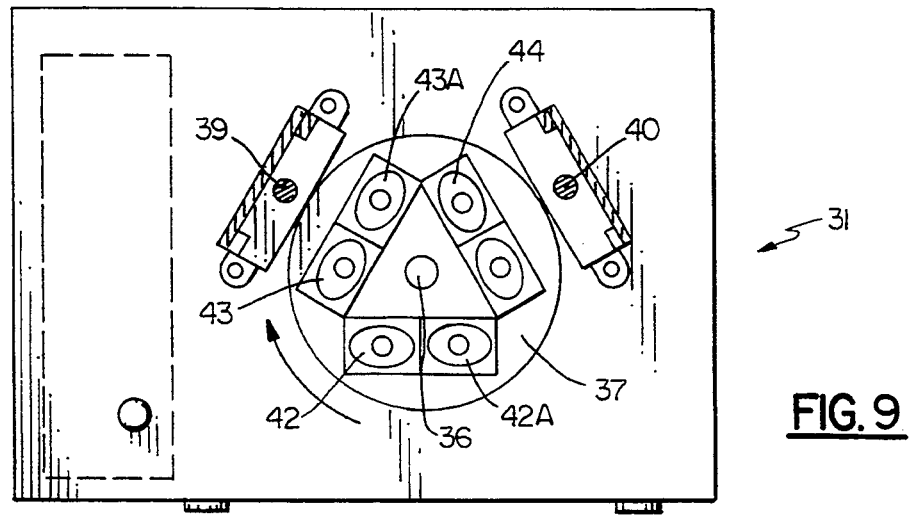
FIG. 9 is a horizontal section taken generally along the line 9—9 of FIG. 8.
Figure 8:
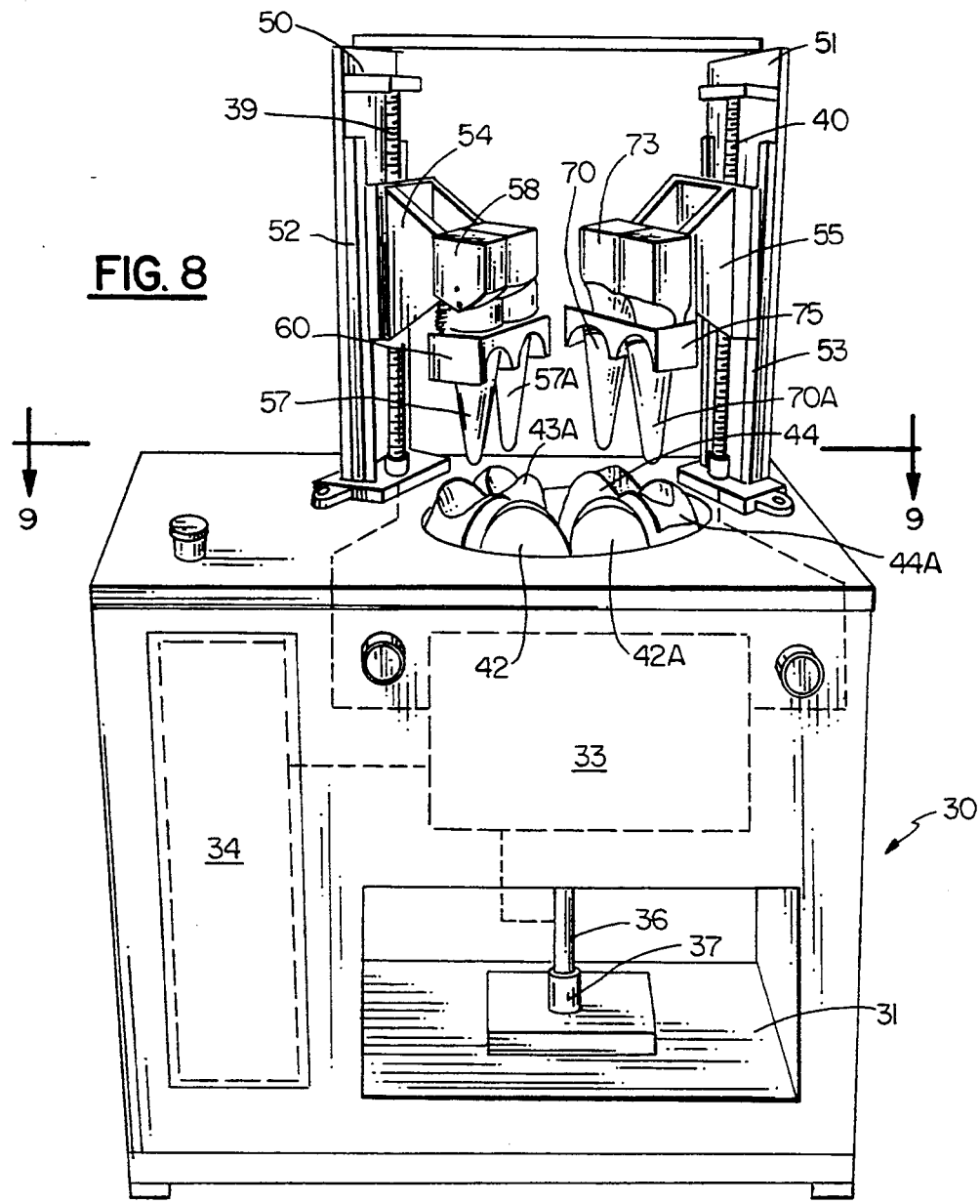
FIG. 8 is an overall perspective view of apparatus for making the cone of the invention.
Figure 10:
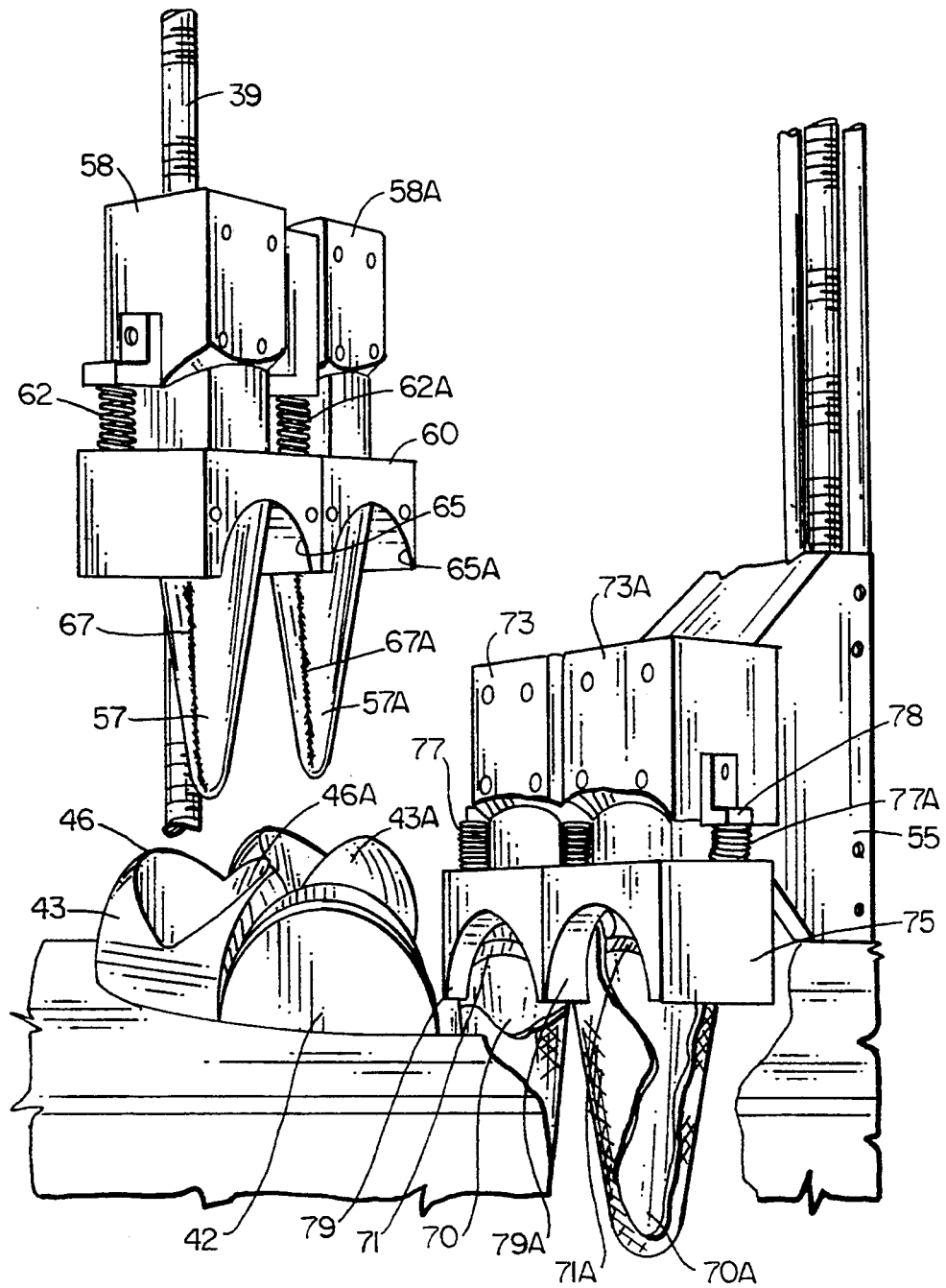
FIG. 10 is an enlarged fragmentary perspective view partly broken away showing the female molds and the male forming and cooking molds of the apparatus.

Apparatus for making the cones is shown in FIGS. 8 to 10. The apparatus includes a base cabinet 30 with a floor 31. Appropriate operating control knobs are accessible on the exterior of the cabinet 30. Within the cabinet 30 is a rotary drive device 33 operated by a computer 34. The rotary drive device 33 permits selective on-off rotation of an axle 36 extending upwardly from a thrust bearing 37 on the floor 31 of the cabinet 30. The rotary drive device 33 also imparts selective on-off axial rotation to a pair of vertical screw shafts 39 and 40 also mounted in suitable bearings.

Affixed concentrically to the axle 36 is a carousel 41 upon which are mounted three similar pairs of cojoined female molds 42-42A, 43-43A and 44-44A located end-to-end 120° apart in an isosceles triangle arrangement as shown particularly in FIG. 9. The axle 36 is turned clockwise as shown in FIG. 9 by the rotary drive device 33, controlled by the computer 34, to provide indexing means which can locate each pair of female molds first at a dough-loading and cone-removing station (where female molds 42-42A are in FIG. 9), then at a forming station (where molds 43-43A are in FIG. 9), then at a cooking station (where molds 44-44A are in FIG. 9), and finally back to the cone-removing and dough-loading station.

Each female mold of each of the pairs 42-42A, 43-43A and 44-44A is of polytetraflourethylene-coated aluminum and is heated by gas firing or electrically to a temperature of about 360° F. controlled by the computer 34. Each defines a mold cavity having an outer configuration similar to that of the preferred form of cone described previously in relation to FIGS. 1 to 5. Thus each female mold includes a body of substantially right elliptical cone shape with opposed proximate and remote sides flairing upwardly from a lower closed vertex portion to and including an upper mouth portion. Each female mold also includes opposed lip-forming portions defining the mouth portion and having arcuate edges (for example, 46-46A in FIG. 10) joined end-to-end at the center of the opposed remote sides of the body and curving upwardly away from one another and from the vertex portion so that the edges are farthest from one another and from the vertex portion at the center of the proximate sides of the body. The difference between the distance from the vertex portion to the arcuate edges of the lip segments at the opposed proximate sides of the body and the distance from the vertex portion to the arcuate edges at the opposed remote sides of the body is sufficient to permit lip segments on the cone to be gathered together and crimp sealed over edible contents within the cone as described in relation to FIGS. 6 and 7.

The screw shafts 39 and 40 are mounted in frames 50 and 51 which have respective pairs of vertical tracks 52 and 53 on which are mounted respective slides 54 and 55 which are translatable up and down by rotation of the respective screw shafts 39 and 40. As shown particularly in FIG. 10, at the second or forming station referred to previously are a pair of male forming molds 57-57A each having an exterior configuration substantially matching that of the female mold cavity described above. The male forming molds extend integrally from respective shanks 58 and 58A which in turn are affixed to the slide 54.

A sleeve element 60 closely surrounds and is slidable up and down on the respective shanks 58 and 58A between upper and lower extremes limited by stops which are not shown. At least two compression springs 62 and 62A act between the upper surface of the sleeve 60 and appropriate abutment means (see 63) on one or both of the shanks 58 and 58A to urge the sleeve downwardly against its lower stopped position. For each male forming mold 57–57A the sleeve has respective lower curved annular surfaces 65 and 65A conformable to and engageable with the arcuate edges (for example 46–46A) of the lip-forming portions of the associated female molds to cover the associated mold cavity mouths when the associated male forming molds is in inserted position. The compression springs 62 and 62A allow limited axial withdrawal of the associated male forming molds 57–57A from the female molds while the associated sleeve 60 and its lower annular surfaces 65 and 65A remain urged against the arcuate edges (for example 46–46A) of the lip-forming portion of the associated female mold. The springs 62 and 62A also cause each cone to be pushed off its associated male mold upon withdrawal of the male mold.

Figure 11:
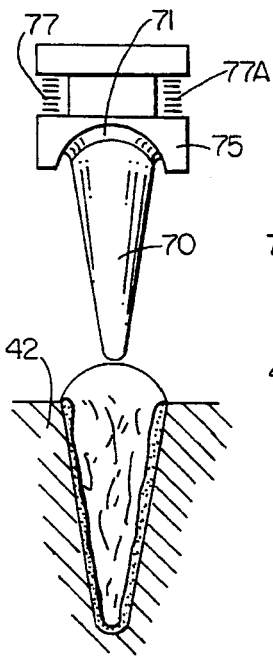
FIGS. 11A to 11Q are a series of somewhat schematic illustrations showing the successive steps of the method of the invention for making the cone of the invention.
Figure 11:
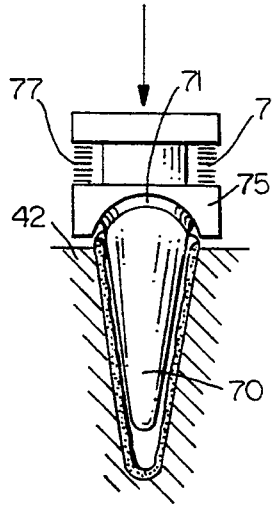
Figure 11:
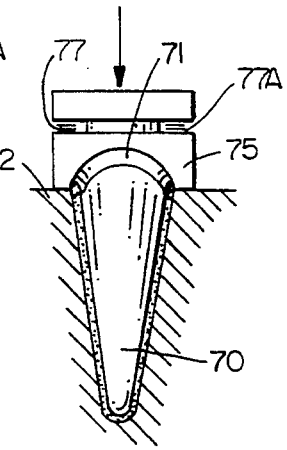
Figure 11:
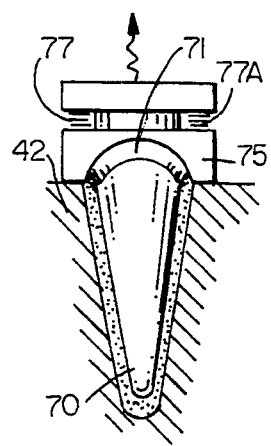
Figure 11:
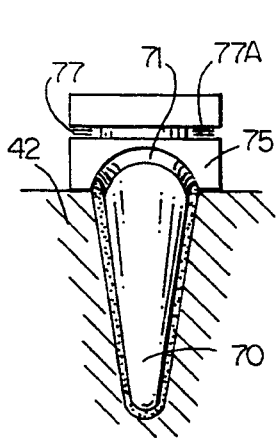
Figure 11:
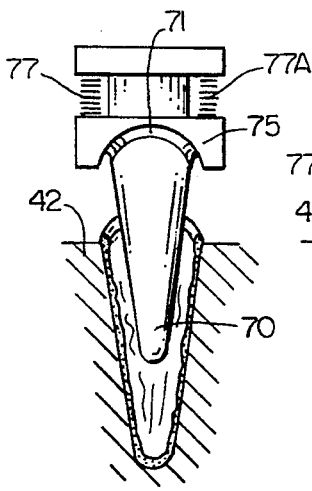
Figure 11:
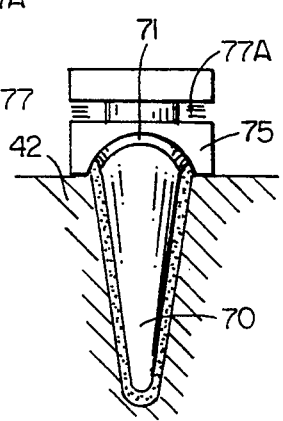
Figure 11:
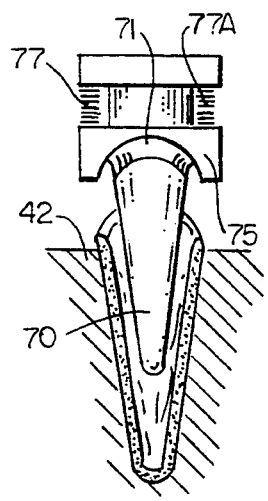
Figure 11:
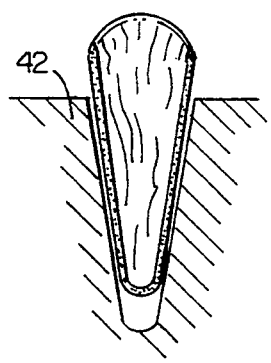

A pair of crease-forming linear ridges are formed on each male forming mold from its vertex portion to the end-to-end joinder points of its opposed lip-forming portions (one ridge is shown as 67 and 67A on each of the forming molds 57 and 57A in FIG. 11). These ridges form the crease lines 18 and 18A in the finished cone.

At the third or cooking stage referred to previously are a pair of male cooking molds 70–70A, shown in FIG. 10 with cones formed around them. They are of polytetraflourethylene-coated aluminum. Like the male forming molds 57–57A each has an exterior configuration substantially matching that of the female mold cavity described above. Each may have crease forming ridges similar to the ridges 67 and 67A. However, each of the male cooking molds 70–70A is also formed with an encircling cutaway groove 71–71A along a curved path which is disposed generally opposite the arcuate edges (for example 46–46A) when the male cooking molds 70–70A are in their inserted position. The grooves 71–71A may be about three-eighths inch wide.

The male cooking molds 70–70A extend integrally from respective shanks 73–73A and the shanks are in turn affixed to the slide 55. A sleeve 75 closely surrounds and is slideable up and down on the respective shanks 73–73A between upper and lower limits provided by stops which are not shown. At least two compression springs 77 and 77A act between the upper surface of the sleeve 75 and appropriate abutment means 78 on one or both of the shanks 73 and 73A to urge the sleeve 75 downwardly against its lower stopped position. For each of the male cooking molds 70–70A the sleeve 75 has respective lower curved annular surfaces 79 and 79A conformable to and engageable with the arcuate edges (for example 46–46A) of the lip-forming portions of the associated female molds to cover the associated mold cavity mouths when the associated male cooking molds are in inserted position. The compression springs 77 and 77A allow limited axial withdrawal of the associated male cooking molds 70–70A from the female molds while the associated sleeve 75 and its lower annular surfaces 79 and 79A remain urged against the arcuate edges (for example 46–46A) of the lip-forming portions of the associated female molds. They also serve to push off the cone as described with reference to the springs 62 and 62A.

The spring bias of the springs 62 and 62A associated with the forming molds 57–57A is less than that of the springs 77 and 77A associated with the male cooking mold 70–70A. One function of the springs 62 and 62A is to allow limited escape of steam during dough expansion while containing the dough as described below while a function of the springs 77 and 77A is to insure a pressure seal during a puffing stage described below. The latter requires a heavier spring bias than the former.

Electrical means controlled by the computer 34 are included for selectively heating the male forming molds 57– 57A to a temperature of about 195° F. and heating the male cooking molds 70–70A to a temperature of about 360° F. during operation.

The method of the invention for making the cone described in reference to FIGS. 1 to 5, as carried out on the apparatus described in relation to FIGS. 8 to 10, will now be explained in relation to FIGS. 11A to 11Q. These sequential illustrations are somewhat schematic and therefore the apparatus components shown are not exact portrayals of the parts referred to in connection with FIGS. 8 to 10. However, the same reference numerals are used. The method is shown in FIGS. 11A to 11Q in connection with a single female mold 42 and only one male forming mold 57 and male cooking mold 70 are shown. The sleeve element 60 associated with the male forming mold 57 and the sleeve element 75 associated with the male cooking mold 70 are also shown schematically, each with its own springs 62–62A and 77–77A. The encircling cutaway groove 71 is shown on the male cooking mold 70 in the steps of FIGS. 11I through 11P.

A pre-determined amount of unleavened paté dough 80 of oblong shape is deposited in the vertex portion of the female mold 42 as shown in FIGS. 11 and 11A. As described previously, the dough is unleavened and protein-rich and may have particulate material embedded on its exterior surface. The insertion of the dough 80 takes place at the dough-loading and cone-removing station. The female mold 42 at this initial station is pre-heated to a temperature of about 350° F.

The female mold 42 is then indexed to the forming station shown in FIG. 11B to 11H beneath one of the male forming molds 57 which is pre-heated to a temperature of approximately 195° F. The male forming mold 57 is then lowered into the female mold 42 to thrust into the dough 80 as shown in FIG. 11C and 11D until the dough is forced throughout the entire mold cavity around the male mold 57 into the lip-forming portions of the female and male molds. The sleeve 60 prevents the dough from escaping beyond those lip-portions as shown in FIGS. 11D and 11E.

The downward force on the male mold 57 is relieved at the stage shown at FIG. 11E to allow the male mold 57 to "float" which permits release of steam and allows the dough to expand. Spring mounting of the male molds on their slides 52 and 53 may be utilized to assist in this floating step. After approximately one hundred seconds of contact between the male mold 57 and the dough, the male mold 57 is backed up to the position shown in FIG. 11F and then withdrawn as shown in FIG. 11G. At this point the crease lines 18 and 18A are initially formed, the outer surface of the cone is slightly pan-toasted and the inner surface is substantially undercooked and just firm enough to be no longer sticky. During the withdrawal the springs 62 and 62A assist in pushing the cone off from the male forming mold 57 so as to be left within the female mold 42. At FIG. 11H the male forming mold 57 is shown fully withdrawn and the cone is partially cooked sufficiently to be self-supporting. The female mold 42 is then indexed to the next or cooking station shown in FIG. 11I.

The male cooking mold 70 at the cooking station is pre-heated to approximately 360° F. As shown in FIG.

11J it is first inserted downwardly into the partially cooked cone but stops just short of contact with the inner wall of the cone. The male cooking mold 70 may be held there for approximately five seconds until by means of radiant heat a skin begins to form on the inside surface of the partially cooked dough. The male cooking mold 70 is then inserted fully as shown in FIG. 11K into pan-toasting contact with the dough. It is then allowed to float as shown in FIG. 11L and this cycle is repeated every few seconds at least three times. Steam is trapped in the mold cavity because the sleeve 75 closes the annulus around the mold mouth. This pressurization begins the formation of billowing pockets of air between layers of the dough, which is to say the beginning of the pita-puffing effect. Because the cooking dough does not engage the surface of the male mold 70 at the encircling cutaway groove 71, a rim is formed on the lip segments which is less cooked and therefore thicker than the remainder of the cone wall. Generation of steam declines substantially after about ten seconds into this cycle and the male cooking mold 70 is then thrust into the fully inserted position shown in FIG. 11M. Next the male cooking mold 70 is suddenly partially withdrawn as shown in FIG. 11N to allow unrestrained puffing of the cone wall to continue to a maximum. The male cooking mold 70 is once more lowered into its inserted position as shown in FIG. 11O and this cycle of insertion and withdrawal is repeated three or four times to achieve full pita-puffing and a double-wall throughout most of the cone body.

After approximately seventy-five seconds of the cycle of FIGS. 11M to 11O the male cooking mold 70 is raised as shown in FIG. 11P and the female mold 42 is rotated to its final (also initial) cone-removing and dough-loading station at which the finished cone is withdrawn as shown in FIG. 11Q. Again, the springs 77 and 77A aid in pushing the cooked cone off the cooking mold and into the female mold 42. The female mold is then recharged with another amount of dough 80 as shown in FIG. 11A.

With the three cojoined pairs of female molds and the pairs of male forming molds and male cooking molds it is possible to produce by the apparatus and method of the invention two cones every one hundred and ninety-six seconds. After being made the cones may be filled with edible contents and the edges of their lip segments may be crimp-sealed as described in reference to FIGS. 6 and 7 or served immediately in an open uncrimped capacity.

The scope of the invention is to be determined by the following claims rather than the foregoing description of preferred embodiments of the cone and its apparatus and method of manufacture.

What is claimed is:

1. An edible cone adapted to contain edible contents comprising
   a) a closed vertex portion,
   b) a flexible body of substantially right elliptical cone shape with opposed rounded proximate and remote sides flairing from the vertex portion to and including a mouth portion, and
   c) opposed lip segments defining said mouth portion and having arcuate edges joined end-to-end at the opposed remote sides of the body and curving away from one another and from the vertex portion so that the lip segment edges are farthest from one another and from the vertex portion at the proximate sides of the body.

2. An edible cone according to claim 1 wherein a substantial portion of the body comprises a double thickness pita-like wall.

3. An edible cone according to claim 1 wherein the lip segment arcuate edges define a less than fully cooked mouth rim which is thicker than the remainder of the cone.

4. An edible cone according to claim 1 wherein the arcuate edges of the mouth portion are joined end-to-end substantially at the center of the opposed remote sides of the body and the lip segment edges are farthest from one another and from the vertex portion substantially at the center of the opposed proximate sides of the body.

5. An edible cone according to claim 1 wherein a pair of opposed crease lines of relatively thin wall thickness are formed from the vertex portion to the respective end-to-end joinder points of the opposed lip segments.

6. An edible cone according to claim 1 wherein the difference between the distance from the vertex portion to said arcuate edges of the lip segments at the opposed proximate sides of the body and the distance from the vertex portion to the end-to-end joinder points of the opposed lip segments is sufficient to permit said lip segments to be gathered together over edible contents within the cone.

7. An edible cone according to claim 1 wherein edible particulate material is embedded in the exterior surface of the body portion.

8. An edible cone according to claim 1 wherein the cone is cooked from unleavened dough formed of a protein-rich paté of at least one of lean meat, chicken, seafood, cheese and soy curd mixed with a lesser amount by volume of a binding agent.

9. An edible cone according to claim 8 wherein the dough comprises approximately two parts by volume of said paté and one part by volume of said binding agent, and said binding agent is flour.

10. An edible cone according to claim 9 wherein said flour comprises approximately equal parts by volume of a protein-rich high-gluten elastic flour and a firm-setting fine-grain stable corn-and-rice flour blend.

11. An edible cone containing edible contents comprising
    a) a closed rounded vertex portion,
    b) a flexible body of substantially right elliptical cone shape with opposed rounded proximate and remote sides flairing from the vertex portion to a mouth portion, and
    c) opposed lip segments defining said mouth portion and having arcuate edges joined end-to-end substantially at the center of the opposed remote sides of the body and curving away from one another and from the vertex portion so that the lip segment edges are farthest from one another and from the vertex portion substantially at the center of the proximate sides of the body,
    d) the lip segment edges being sized to be capable of being gathered together over the edible contents within the cone.

12. An edible cone according to claim 11 wherein the lip segment edges are gathered together along a serpentine line throughout their length.

13. An edible cone adapted to contain edible contents comprising
    a) a closed rounded vertex portion,
    b) a flexible body of substantially right elliptical cone shape with opposed rounded proximate and remote aides flairing from the vertex portion to and including a mouth portion, c) a substantial portion of said body comprising a double thickness pita-like wall, d) opposed lip segments defining said mouth portion and having arcuate edges joined end-to-end substantially at the center of the opposed remote sides of the body and curving away from one another and from the vertex portion so that the lip segment edges are farthest from one another and from the vertex portion substantially at the center of the proximate sides of the body, and e) a pair of opposed crease lines of relatively thin wall thickness formed from the vertex portion to the respective end-to-end joinder points of the opposed lip segments, f) the difference between the distance from the vertex portion to the arcuate edges of the lip segments at the center of the opposed proximate sides of the body and the distance from the vertex portion to the end-to-end joinder points of the opposed lip segments being sufficient to permit the lip segments to be capable of being gathered together over edible contents within the cone, g) said lip segment arcuate edges defining a less than fully cooked mouth rim which is thicker than the remainder of the cone.

14. An edible cone according to claim 13 wherein the cone is cooked from unleavened dough formed from a protein-rich paté of at least one of lean meat, chicken, seafood, cheese and soy curd mixed with a lesser amount by volume of flour, and edible particulate material is embedded in the exterior of the body.

15. Apparatus for making edible cones adapted to contain edible contents comprising a) a female mold defining a mold cavity having a lower closed vertex portion, a body of substantially right elliptical cone shape with opposed proximate and remote sides flairing upwardly from the vertex portion to and including an upper mouth portion, and opposed lip-forming portions defining the mouth portion and having arcuate edges joined end-to-end at the opposed remote sides of the body and curving upwardly away from one another and from the vertex portion so that said edges are farthest from one another and from the vertex portion at the proximate sides of the body;

b) a male forming mold having an exterior configuration substantially matching that of the female mold cavity and insertable within the mold cavity in closely spaced relation thereto;

c) a male cooking mold having an exterior configuration substantially matching that of the male forming mold and insertable within the mold cavity in closely spaced relation thereto and also formed with an encircling cutaway groove along a curved path disposed generally opposite the arcuate edges of the lip-forming portions of the female mold when the male cooking mold is in its inserted position in the mold cavity;

d) means for heating each of the female mold and the male molds;

e) a shank from which each male mold depends;

f) displacement means associated with each shank for moving its associated male mold axially into and out of the mold cavity of the associated female mold; and g) a sleeve closely surrounding each shank and having a lower curved annular surface conforming to and engaging the arcuate edges of the lip-forming portions of the female mold to cover the mold cavity mouth when the associated male mold is in its inserted position;

h) each sleeve being axially displaceable on its shank against a compression spring bias to allow limited axial withdrawal of the associated male mold while the associated sleeve lower annular surface remains urged against the arcuate edges of the lip-forming portion of the female mold.

16. Apparatus according to claim 15 wherein a pair of crease-forming linear ridges is formed on at least one of the female mold and the male forming and cooking molds from the associated vertex portion to the end-to-end joinder points of the opposed lip-forming portions.

17. Apparatus according to claim 15 wherein the spring bias on the sleeve associated with the male forming mold is less than that on the sleeve associated with the male cooking mold.

18. Apparatus according to claim 15 wherein each of the female and male molds is formed of polytetraflourethylene-coated aluminum.

19. Apparatus according to claim 15 wherein the arcuate edges of the opposed lip-forming portions are joined end-to-end substantially at the center of the opposed remote sides of the body and the lip segment edges are farthest from one another and from the vertex portion substantially at the center of the proximate sides of the body.

20. Apparatus according to claim 15 wherein the difference between the distance from the vertex portion to said arcuate edges of the lip segments at the opposed proximate sides of the body and the distance from the vertex portion to said arcuate edges at the opposed remote sides of the body are sufficient to permit the lip segments on the cone to be gathered together over edible contents within the cone.

21. Apparatus according to claim 15 wherein indexing means are provided for first locating the female mold at a dough-loading and cone-removing station, then locating the female mold at a forming station for insertion of the male forming mold, then locating the female mold at a cooking station for insertion of the male cooking mold and then returning the female mold to the first cone-removing and dough-loading station.

22. Apparatus according to claim 21 wherein said female mold is mounted on a carousel which is rotated to advance the female mold from one of said stations to the next.

23. Apparatus according to claim 15 wherein the compression spring bias on each sleeve also causes the cone to be pushed off the associated male mold upon withdrawal of the male mold.

24. Apparatus according to claim 15 wherein a plurality of said female molds are cojoined and operate with respective pluralities of corresponding cojoined male forming molds and cooking molds.

25. A method of making edible cones adapted to contain edible contents which comprises a) placing a pre-determined amount of selected dough in a mold cavity in a heated female mold having a lower closed vertex portion, a body of substantially right elliptical cone shape with opposed proximate and remote sides flairing upwardly from the vertex portion to and including an upper mouth portion, and opposed lip-forming portions defining the mouth portion and having arcuate edges joined end-to-end at the opposed remote sides of the body and curving upwardly away from one another and from the vertex portion so that said edges are farthest from one another and from the vertex portion at the proximate sides of the body;

b) inserting into the mold cavity a heated male forming mold having an exterior configuration substantially matching that of the mold cavity until the male forming mold is in closely spaced relation to the cavity and the dough is forced throughout the entire cavity around the entire male forming mold;

c) covering an otherwise open annulus between the male forming mold and the arcuate edges of the female mold mouth lip portion to prevent escape of dough therethrough;

d) allowing the male forming mold to back off in relation to the cavity to the cavity while continuing to cover said annulus to cook the dough to firm but not fully cooked consistency making it self-supporting in the cavity upon withdrawal of the male forming mold;

e) withdrawing the male forming mold from contact with the not fully cooked dough;

f) inserting into the mold cavity a heated male cooking mold having an exterior configuration substantially matching that of the male forming mold and also formed with an encircling cutaway groove along a curved path disposed generally opposite the arcuate edges of the lip-forming portions of the female mold when the male cooking mold is in its inserted position in the die cavity;

g) covering an otherwise open annulus between the male cooking mold and the arcuate edges of the female mold mouth lip portions to control steam release;

h) advancing the male cooking mold to its fully inserted position in the cavity in contact with the inner surface of the dough;

i) withdrawing and reinserting the male cooking mold in a selected time cycle in relation to the cavity while continuing to cover said last-mentioned annulus to cook the dough fully but leaving a not fully cooked thicker rim about the arcuate edges of the mouth lip portions not engaged by the male mold at the cutaway groove;

j) fully withdrawing the male cooking mold from the cavity; and k) removing the cooked cone from the cavity.

26. A method according to claim 25 wherein the withdrawing and resetting of the male cooking mold results in a double thickness pita-like cone wall.

27. A method according to claim 25 wherein a pair of crease-line-forming linear ridges is formed on at least one of the female mold and male forming and cooking molds from the associated vertex portion to the end-to-end joinder points of the opposed lip-forming portions.

28. A method according to claim 25 wherein the temperature of the heated female mold is greater than that of the male forming mold.

29. A method according to claim 25 wherein the temperature of the heated male cooking mold is greater than that of the female mold.

30. A method according to claim 25 wherein the temperature of the female mold is approximately 350° F., that of the male forming mold is approximately 195° F. and that of the male cooking mold is approximately 360° F.

31. A method according to claim 25 wherein said predetermined amount of dough has edible particulate material embedded in the exterior surface a portion of which is disposed on the exterior surface of the cooked cone.

32. A method according to claim 25 wherein said predetermined amount of dough is formed of a protein-rich paté of at least one of lean meat, chicken, seafood, cheese and soy curd mixed with a lesser amount by volume of a binding agent.

33. A method according to claim 32 wherein the dough comprises approximately two parts by volume of said paté and one part by volume of said binding agent and said binding agent is flour.

34. A method according to claim 33 wherein said flour comprises approximately equal parts by volume of protein-rich high-gluten elastic flour and a firm-setting fine-grain stable corn-and-rice flour blend.

35. A method according to claim 25 which includes the additional steps of placing edible contents within the cooked cone so that said contents are crowned between lip segments of the cone formed by said opposed lip forming portions defining the mouth portion of the female mold, folding said lip segments together over the crown of edible contents, and crimp-sealing together the edges of said lip segments to enclose said edible contents within the cone.

36. A method according to claim 35 wherein the lip segment edges are gathered together along a serpentine line throughout their length.

* * * * *

UNITED STATES PATENT AND TRADEMARK OFFICE
CERTIFICATE OF CORRECTION

PATENT NO. : 5,336,511
DATED : August 9, 1994
INVENTOR(S) : Daniel VanDerBeek

It is certified that error appears in the above-indentified patent and that said Letters Patent is hereby corrected as shown below:

Title page, item [76], inventor: should read--VanDerBeek--.
                            address: should read--Glasco--.

Signed and Sealed this

Thirteenth Day of December, 1994

Attest:

BRUCE LEHMAN

Attesting Officer     Commissioner of Patents and Trademarks